April 8, 1952 R. W. LUCE 2,592,162
SALT SHAKER ARRANGEMENT WITH DESICCANT CONTAINER
Filed May 10, 1948
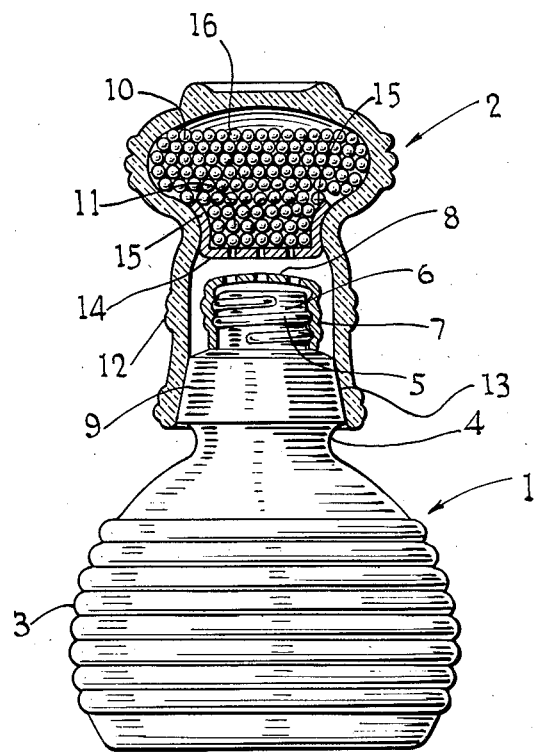
INVENTOR.
RICHARD W. LUCE
BY
George F. Gill
ATTORNEY Patented Apr. 8, 1952

2,592,162

UNITED STATES PATENT OFFICE 2,592,162

SALT SHAKER ARRANGEMENT WITH DESICCANT CONTAINER

Richard W. Luce, Southport, Conn., assignor to Luce Manufacturing Company, Groton, Vt., a corporation of Delaware Application May 10, 1948, Serial No. 26,061

2 Claims. (Cl. 222—190)

The invention herein disclosed relates to a salt shaker arrangement for dispensing table salt. More particularly, the invention relates to a salt shaker that is especially adapted to maintain the salt in a free flowing condition.

The common salt shaker includes a chamber for holding a quantity of salt and an end section or cap that is perforated. The salt is dispensed through the perforations. During humid days, the salt absorbs moisture and the moisture laden crystals clog the dispensing perforations. It is an object of this invention to provide a salt shaker arrangement in which the clogging of the dispensing perforations is avoided and in which the salt is maintained in a free flowing condition.

The foregoing object and certain advantages that will hereinafter appear, are realized in the salt shaker, selected to illustrate one specific embodiment of the invention, shown in the accompanying drawing and described in detail below.

The single figure in the drawing is an elevation, partly in section, of a salt shaker embodying the invention.

In general, a salt shaker arrangement embodying this invention includes a salt shaker that has a chamber for holding a quantity of salt and a perforated section or cap through which the salt contained in the chamber is dispensed. In addition, the salt shaker arrangement includes a container for a desiccant. The desiccant container has an opening thereto sufficient to permit the passage of air but insufficient to allow the passage of the desiccant. The salt shaker and the desiccant container are provided with engaging surfaces that are arranged to effect a substantially air-tight passage between the perforated section of the salt shaker and the opening to the chamber for the desiccant. With this arrangement, any moisture that may be absorbed by the salt, while the salt shaker is being used to dispense salt therefrom, is absorbed by the desiccant in the desiccant container. Generally speaking, the dispensing perforations of a salt shaker are clogged by the adherence of moisture laden crystals of salt. Normally, all of the salt in a salt shaker does not become saturated with moisture. However, a few saturated grains, adhering to the perforated section or cap, are sufficient to clog the perforations. With the arrangement of this invention, the moisture is extracted from the saturated salt crystals by the desiccant which has a greater affinity for moisture than the salt crystals. In this way, the dispensing perforations are maintained clear and the salt within the salt shaker is maintained in a free flowing state.

The specific salt shaker arrangement embodying this invention that is illustrated in the drawing includes a salt shaker designated generally by the numeral 1, and the desiccant container designated generally by the numeral 2. The salt shaker includes a body portion 3 that is hollow and forms a chamber for containing a quantity of salt, a neck portion 4 and an end section 5. The end section 5 is provided with a thread 6 and on this end section, there is threaded a metal and cap 7, the end wall of which is perforated in the usual manner so that salt may be dispensed through the perforations for seasoning food. On the neck portion 4 of the salt shaker, between the body 3 and the end portion 5, there is a frusto-conical, ground section 9. This conical section is provided for engagement with a complementary conical section on the desiccant container 2.

The desiccant container 2 is preferably made from heat-resisting glass. In addition, it should be color-transparent, or, at least, one section thereof should be color-transparent. The particular desiccant container illustrated in the drawing includes a desiccant chamber 10 open at 11. A skirt 12 extends from the open end of the desiccant chamber, and near the end thereof, it is provided with an internal frustro-conical ground section 13. The frustro-conical section 13 is complementary to the frustro-conical section 9 of the salt shaker. When the desiccant container is placed over the end section of the salt shaker, as illustrated in the drawing, the ground surfaces of the section 9 of the salt shaker and the section 13 of the desiccant container effect, through the action of gravity acting upon the desiccant container, a substantially air-tight contact. Thus, the skirt 12 forms a substantially air-tight passage between the perforations of the end cap of the salt shaker and the open end of the desiccant chamber 10.

The open end 11 of the desiccant chamber 10 is provided with a perforated diaphram 14. The diaphram 14 has a series of spring grips 15 formed thereon. These spring grips 15 are arranged to engage the inner surface of the container at the juncture of the skirt 12 and the chamber 10. They are curved, as illustrated, to conform to the curvature of the engaging surface. The diaphram, except for the perforations therethrough, closes the opening 11 to the desiccant chamber 10.

Before the diaphragm 14 is snapped into place, the desiccant chamber 10 is filled with a desiccant. A desirable desiccant for this purpose is activated aluminum oxide. The crystal size of the activated aluminum oxide used is such that it cannot pass through the preforations in the diaphragm 14. Desirably the activated aluminum oxide is provided with a color-indicator. Such material may be purchased on the open market in any grain size. It is blue in color when dry, and pink in color when saturated with moisture.

When it is desired to utilize the salt shaker for dispensing salt, the desiccant container is removed from the salt shaker. It may be left off the salt shaker during the course of a meal, if desired. When the salt shaker is not in use, the desiccant container is placed thereon as shown in the drawing. The desiccant has a greater affinity for moisture than the salt. In consequence, if the salt has absorbed any moisture while the sale shaker was in use, the desiccant will remove the moisture. When the desiccant becomes saturated, indicated by the color changing from blue to pink, the desiccant container is heated for a short period of time, as by being placed in the oven of a stove. The heat drives the moisture from the desiccant which, on being dried, turns, again, blue in color.

From the foregoing description of the embodiment of the invention illustrated in the drawings, it will be apparent to those skilled in the art, that by this invention there is provided a salt shaker arrangement which avoids the clogging of the perforations through which the salt is dispensed which clogging normally occurs in humid weather, and a salt shaker arrangement that maintains the salt in a free flowing condition. It will also be apparent that the arrangement has indefinite utility, since the desiccant may be rejuvenated merely by heating for a short period of time.

It will be obvious that various changes may be made by those skilled in the art in the details of the embodiment of the invention illustrated in the drawing and described above within the principle and scope of the invention as expressed in the appended claims.

I claim:

1. A salt shaker arrangement of the kind described comprising in combination a salt shaker including a portion forming a chamber for holding a quantity of salt and a neck portion, a cap for the neck portion having a perforated end wall and a skirt, releasable interengaging means on the cap and neck portion for releasably securing the cap to the neck portion, and a container for a desiccant including a dome-shaped portion for the desiccant and a circumambient skirt portion for enclosing the neck of the salt shaker, a part of said dome-shaped portion being color-transparent, a perforated, metal diaphragm at the juncture of said dome-shaped and skirt portions, and a regenerative desiccant with a color indicator within the dome-shaped portion of the desiccant container.

2. A salt shaker arrangement of the kind described comprising in combination a salt shaker including a portion forming a chamber for holding a quantity of salt and a neck portion extending from said chamber forming portion, a cap for the neck portion having a perforated end wall and a skirt, releasable interengaging means on the cap and neck portion for releasably securing the cap to the neck portion, and a container for a desiccant consisting of a single piece of heat resistant, color-transparent glass and including a dome-shaped portion for the desiccant and a circumambient skirt portion for enclosing the neck of the salt shaker, a perforated, metal diaphragm at the juncture of said dome-shaped and skirt portions having resilient fingers extending into and engaging the inner surface of the dome-shaped portion and retaining the diaphragm in place, and a regenerative desiccant with a color indicator within the dome-shaped portion of said desiccant container.

RICHARD W. LUCE.

REFERENCES CITED

The following references are of record in the file of this patent:

UNITED STATES PATENTS

| Number | Name | Date |
| --- | --- | --- |
| 743,340 | Simundt | Nov. 3, 1903 |
| 813,649 | Jones | Feb. 27, 1906 |
| 1,055,400 | Jewett | Mar. 11, 1913 |
| 1,318,939 | Willert | Oct. 14, 1919 |
| 1,346,007 | De Aguiar | July 6, 1920 |
| 1,534,339 | Perry | Apr. 21, 1925 |
| 1,534,342 | Weihmann | Apr. 21, 1925 |
| 1,567,726 | Frierson | Dec. 29, 1925 |
| 1,947,600 | Isenhower | Feb. 20, 1934 |
| 2,315,049 | Cronstedt | Mar. 30, 1943 |
| 2,342,932 | Frame et al. | Feb. 29, 1944 |